United States Patent [19]

Carter

[11] Patent Number: 5,211,792
[45] Date of Patent: May 18, 1993

[54] METHOD OF LAMINATING MULTIPLE LAYERS

[76] Inventor: Richard Carter, 5582 Kathy Ct., Newport, Mich. 48166

[21] Appl. No.: 890,344

[22] Filed: May 21, 1992

Related U.S. Application Data

[63] Continuation of Ser. No. 516,318, Apr. 30, 1990, abandoned.

[51] Int. Cl.⁵ .................. B32B 31/20; B32B 31/26; C09J 5/06
[52] U.S. Cl. .................. 156/245; 156/222; 156/306.6; 156/322
[58] Field of Search ............... 156/245, 222, 224, 242, 156/322, 179, 306.6, 309.9, 324, 324.4; 264/257, 258

[56] References Cited

U.S. PATENT DOCUMENTS

| | | | |
|---|---|---|---|
| 3,068,130 | 12/1962 | Gaquin et al. | 156/324 |
| 3,644,157 | 2/1972 | Draper | 156/322 |
| 3,765,998 | 10/1973 | Oswald | 264/136 |
| 3,837,992 | 9/1974 | Sherman et al. | 156/306.6 |
| 3,850,725 | 11/1974 | Spielau et al. | 156/309.9 |
| 3,862,877 | 1/1975 | Camden | 156/179 |
| 3,996,082 | 12/1976 | Leatherman | 156/73.5 |
| 4,128,682 | 12/1978 | Nomura | 156/322 |
| 4,129,672 | 12/1978 | Momura | 156/322 |
| 4,221,619 | 9/1980 | Lemons | 156/71 |
| 4,314,867 | 2/1982 | Berger | 156/322 |
| 4,445,954 | 5/1984 | Adams | 156/245 |
| 4,497,678 | 2/1985 | Nussbaum | 156/244.11 |
| 4,500,594 | 2/1985 | Credali et al. | 428/284 |
| 4,563,229 | 1/1986 | Sorez | 156/64 |
| 4,571,279 | 2/1986 | Oizumi et al. | 156/270 |
| 4,588,458 | 5/1986 | Previsani | 156/71 |
| 4,711,681 | 12/1987 | Grossmann et al. | 156/71 |
| 4,731,276 | 3/1988 | Manning et al. | 428/110 |
| 4,740,417 | 4/1988 | Tornero | 428/308 |
| 4,927,483 | 5/1990 | BVray | 156/306.6 |

*Primary Examiner*—Michael W. Ball
*Assistant Examiner*—Daniel J. Stemmer
*Attorney, Agent, or Firm*—Krass & Young

[57] ABSTRACT

A preheatable scrim and method of use for bonding together multiple layers of materials to form a laminate. The scrim includes a carrier layer which is impregnated with an adhesive having a melting point such that it can set and hold a bond. The scrim is preheated to its activation temperature and sandwiched between the materials layers. The sandwich is pressed together to bond the layers.

14 Claims, 1 Drawing Sheet

METHOD OF LAMINATING MULTIPLE LAYERS

This is a continuation of co-pending application Ser. No. 07/516,318 filed on Apr. 30, 1990, now abandoned.

BACKGROUND OF THE INVENTION

1. Field of the Invention

This invention concerns the field of bonding together multiple layers to form a laminate and, more particularly, a method of bonding wherein an adhesive impregnated scrim is preheated and then placed between the layers of material to be bonded.

2. Description of the Relevant Prior Art

Bonding of laminates by using a film of adhesive that activates under heat to become either tacky or liquid and flowable to form the bond is well known in the prior art. The resultant heat activated bond is mechanical or chemical, or both. The technique of heat activating a film of adhesive is used in many industrial applications and, particularly, in situations where the resultant laminate is molded to form such items as interior panels on vehicles. Examples of patents dealing with the lamination of multiple layers using some form of thermally activated adhesion between the layers are U.S. Pat. Nos: 3,996,082; 4,221,619; 4,500,594; 4,571,279; 4,588,458; 4,711,681; and 4,731,276.

All of the above referenced patents are similar in that the adhesive is heated after it is placed between the layers to be laminated; in other words, the entire laminate sandwich structure must be heated to activate the adhesive. Hence, the activation temperature of the adhesive must, necessarily, be low enough that the heating will cause no harm to any of the materials to be laminated. Furthermore, this prior art technology has other shortcomings. There can be problems getting enough heat through the laminates (which are often formed of thermally insulating materials) to melt the adhesive layer. A typical method of bonding is the use of hot dies (molds and platens); which need much expensive energy to become sufficiently hot. The dies are expensive, and the cycle times are, typically, quite long. These long cycle times result in high capital investment per unit of capacity.

For contoured parts, the laminates are molded by use of heated dies. However, this results in high stress areas on the contoured parts. To mold these highly stressed parts, they must be held in the die until cool down (for a thermoplastic material) or thermoset (for a thermosetting material) occurs. The necessity of cooling down the highly contoured parts causes excessive dwell time in the expensive dies, further exacerbating the problems noted in the prior paragraph. Some systems inject a cooling gas into the die, but such dies must be designed to withstand the stresses caused by the temperature cycling, and are, hence, even more expensive. Furthermore, highly contoured parts cannot be efficiently done on a production basis with current adhesive films due to these problems.

The combination of the viscosity of the molten adhesive combined with the long, hot dwell cycles under pressure in the prior art often causes migration of the molten adhesive into porous substrates. This migration results in adhesive starvation at bond lines and resultant poor bonds in reproducible and non-reproducible modes, and is also detrimental to the porous substrate.

The large molds necessary to form large items have inherent problems of hot and cold spots; temperature variations of 25° F. from one part of the platen to another are normal. Furthermore, pressure differences from one section of the platen to another are also normal due to size variations in the substrate layers and die misalignment. These conditions magnify the problems noted in the preceding paragraphs.

It is known to heat the substrates inside the dies by injection of superheated dry steam. While this system offers a solution to some of the problems noted above, such as migration, a new complication is introduced to the system; the injected superheated dry steam must be kept clean.

Furthermore, in the prior art, the melt temperature of the adhesive must be low enough not to cause damage to the substrates. This requirement imposes a severe constraint on both the types of substrates that may be used, as well as the adhesive itself.

SUMMARY

The method and device disclosed and claimed herein are designed to overcome the problems of the prior art noted above. Applicant's invention is a preheatable scrim which is insertable between the layers of materials to be laminated. The scrim comprises an adhesive layer and a carrier in contact with the adhesive layer. The adhesive is selected so that it exhibits activation properties having a time/temperature window. To this end, the adhesive selected will be normally amorphous in structure, but should also have a degree of crystalinity so that it will set and hold a bond quickly. Alternatively, the adhesive may be one that becomes "tacky" when heated to its activation temperature, or it may be one that has a sharp melting point which is substantially higher than the temperatures at which the layer of materials begin to degrade.

Also disclosed is a method of using the scrim to bond the layers of material together to form a laminate. The scrim is preheated to the activation temperature of the adhesive. By "activation temperature" is meant the temperature at which the adhesive becomes liquid, semi liquid or tacky. When it has reached the activation temperature, the preheated scrim is what is referred to in the art as "bond ready." The bond ready scrim is then positioned between the layers to be laminated to form a sandwich laminate. Sufficient pressure is applied so that the sandwich components are brought into intimate contact with the bond ready scrim and/or each other. The components achieve intimate contact before the scrim cools off and is no longer bond ready. Depending on the shape, the materials and the adhesive used, this intimate contact may be maintained for as short a time as a fraction of a second, such as would occur in a nip roll in a continuous operation, to as long a time as 180 seconds as might occur in piecework.

The adhesive coating on the carrier may be layers of several components. For a continuous carrier, such as film or foil, an adhesive layer will be disposed on both surfaces of the carrier. Multiple layers of different adhesives are used for bonding dissimilar substrates that require different chemistries or mechanisms for specific adhesion to each surface. Furthermore, more layers may be interposed between the multiple layers of adhesives to fill gaps therebetween or for cost reduction.

BRIEF DESCRIPTION OF THE DRAWING

The following detailed description may best be understood by reference to the following drawing in which.

DETAILED DESCRIPTION OF THE PREFERRED EMBODIMENTS

Figure 1:
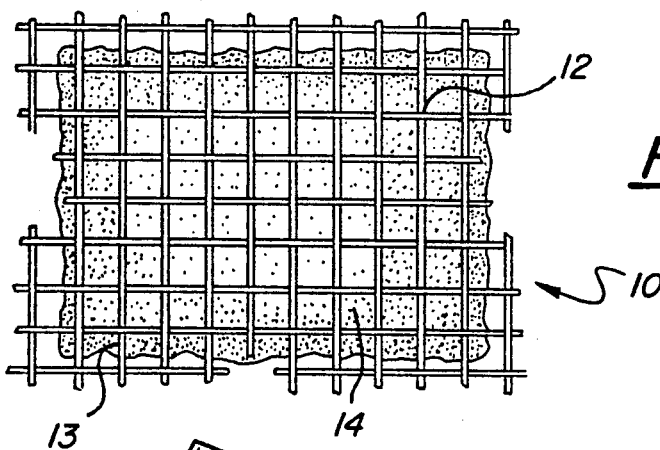
FIG. 1 is a perspective view of the preheatable scrim of the present invention.

Throughout the following detailed description, like reference numerals are used to refer to the same elements shown in multiple figures of the drawing. Referring now to the drawing, and in particular to FIG. 1, there is shown a preheatable scrim 10 of the present invention. The scrim 10 is formed of a carrier 12, here shown in the form of a web formed of woven strands 13 of a material such as fiberglass. It is impregnatingly coated with an adhesive 14, preferably in a film form.

The adhesive 14 is selected to have certain characteristics. The adhesive, itself, can have a sharp melting point which is substantially higher than the degradation temperatures of the layers 16, 18 (shown in FIG. 2) which are to be bonded together. By "degradation temperature" is meant the temperature at which the properties or structure of a material are adversely and irreversibly altered. The adhesive 14 may be either a thermoplastic or thermosetting polymeric or resinous system. After the layers 16, 18 are laminated together by means of preheatable scrim 10, the bonds formed by the adhesive should not deform or yield under loads of 10 grams or more per square inch of film at temperatures of 160° F. or higher, when tested according to ASTM 816, procedure 21, the protocol of which is incorporated by reference herein. It is contemplated that the thickness of adhesive 14 will range between approximately 0.0005 to 0.2500 inches. During the bonding process, the adhesive should either form bonds which do not deform or yield under loads of 10 grams per square inch at temperatures of 160° F. or higher, exhibit a melt viscosity of between 0.100 to 5,000,000 poise during cure, or have bonds which exhibit a progression of cure after initiation thereof at a reduced temperature or over time as demonstrated by an increased softening point. A thermoplastic adhesive should have a melt viscosity of between 0.100 to 5,000,000 poise through a range of at least 10° F. within 100° F. above its softening point as determined by the ASTM 816, procedure 21 softening point test. It has been found that moderately good results can be obtained with Dow ® adhesive film No. 899, which is a copolymer of ethylene and acrylic acid. Other suitable adhesive types could include, for example: ethylene-vinyl acetate; polypropylene; phenolic; polyamide, polyethylene, acrylic; polyurethane and styrene-butadiene systems.

Although depicted in the form of a web, the carrier 12 can comprise a non-woven, knitted, or continuous material. For example, it could be a flimsy piece of continuous substrate structurally similar to facial tissue. It must be able to withstand the temperature and mechanical stresses of the coating process without significant changes in physical properties. After coating with adhesive, the carrier 12 must carry the adhesive through the flexing and bonding processes without adversely affecting the resulting bonded assembly. The carrier 12 is not designed to lend structural support to the bond line, although it may have that incidental function. The carrier 12 functions to carry the adhesive, not to reinforce the bond.

Figure 2:
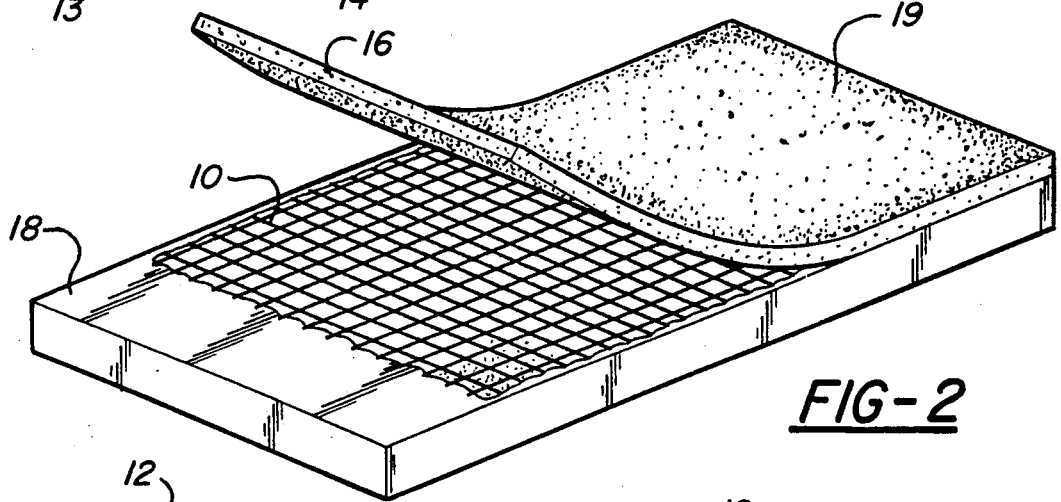
FIG. 2 is perspective view of a laminate formed with the preheatable scrim of FIG. 1, with the top layer shown partially peeled away to expose the scrim.

It is contemplated that, if formed in the web structure shown in FIGS. 1 and 2, the carrier 12 will have from as few as one strand 13 every four inches to as many as 200 strands 13 per linear inch in both directions for conventional two directional construction. If the carrier 12 is cross-woven, the number of strands 13 should not exceed 400 strands per square inch in all directions. Each individual strand 13 has a diameter less than or equal to 0.200 inches. The same diameter requirements apply for strands of non-woven carriers, but the number of strands 13 per square inch can be as high as 4,000.

For many applications, such as automobile interiors, the strands 13 of carrier 12 should be spaced in a range of between 6 to 16 per linear inch. It has been determined that such spacing will result in layers 16–18 which bond together with no adhesive gaps larger than ⅛ inch in diameter.

Figure 3:
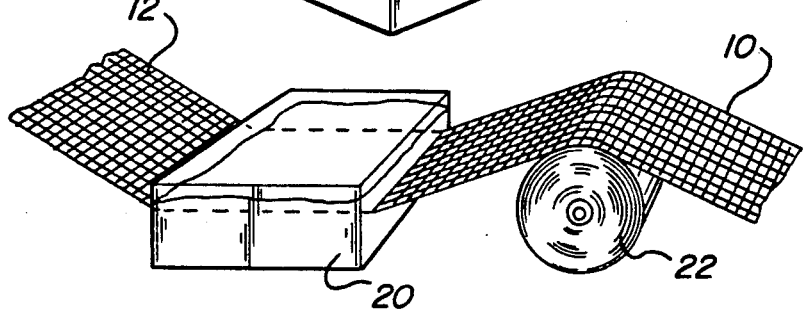
FIG. 3 shows a method of forming the preheatable scrim of the present invention.
Figure 4:
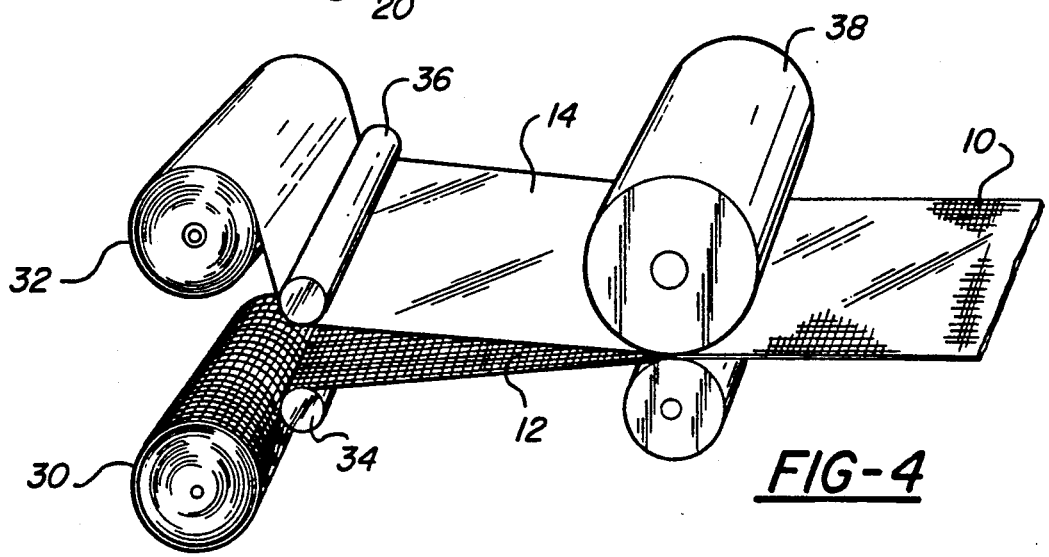
FIG. 4 shows an alternative method for forming the preheatable scrim.

The carrier 12 may be impregnated with the adhesive 14 by any of a number of well known methods. For example, as shown in FIG. 3, the carrier 12 may be passed through a bath 20 of liquid adhesive, and subsequently passed over a roll coater 22 or a knife (not shown) to evenly coat the carrier 12 then cooled down or dried to form the scrim 10. Alternatively, as shown in FIG. 4, carrier 12 and adhesive 14 may be continuously supplied via rollers 30,32. The carrier 12 and the adhesive 14 are then pressed together via heated roller 38 to form the scrim 10. If carrier 12 is continuous film or foil, another adhesive 14 will be contacted with the opposite surface of carrier 12 to form a three-layer sandwich which is then hot rolled to form scrim 10. Doubtless, other variations may occur to those skilled in the art.

As shown in FIG. 2, the preheatable scrim 10 may be used to bond together layers 16–18 to form laminate 19. To accomplish this, the coated scrim 10 is fixtured into a frame (not shown) and put in a heat chamber (not shown) where the adhesive 14 is brought to a temperature of, typically, between 160° to 690° F. for bonding. The means for heating the scrim could include, for example, convection, induction, infrared, ultrasonic, microwave and flame heating. The optimum temperature will vary for each type of adhesive coating, but all will fall into the indicated range. The bond ready scrim 10 is indexed into a holding position between layers 16, 18 and sufficient pressure is applied so that the sandwiched components are brought into intimate contact with the bond ready scrim 10 and/or each other. The pressure may be applied by, for example, a roller, a die, a mold, a platen, etc. The pressure on the sandwiched components is maintained until they all achieve intimate contact before the preheated scrim 10 cools off and is no longer bond ready. In some applications, the intimate contact is maintained for only a fraction of a second; this would be the case for continuous operations in which the pressure is provided by a nip roller. Conversely, in some piecework applications, the intimate contact may be maintained for two or three minutes. In any case, the layers 16,18 will act as a heat sink, helping the adhesive to cool rapidly. If layers 16,18 have a lower melting point than adhesive 14, they will not deform since they do not have to be heated.

Since the scrim 10 is preheated before insertion between layers 16,18 the dwell time within the mold or die is much reduced. Furthermore, the layers of material 16–18 do not need to be heated. Hence, a much wider variety of materials may be laminated together by the method disclosed herein since heat sensitive materials may be selected. Furthermore, since the layers 16-18 are not heated, the cooling time for the laminate is much shorter. Again, this considerably reduces dwell time. Also, because the scrim 10 is heated, rather than the sandwiched components, heating is much more uniform and the problem of hot and cold spots is virtually eliminated.

Hence, by using the preheatable scrim and laminating method disclosed herein, considerable savings may be realized in the laminating process. Reduced dwell times results in shorter cycle times. For example, a prior art cycle time of 30 to 190 seconds may be reduced to 10 seconds or less. Far more laminate can be produced per unit of time. Moreover, the equipment to produce the laminate can be made much simpler since, for molded components, the molds or dies, themselves, no longer need to be heated (i.e., cold molds can be used), and do not need to be provided with the capability of injecting superheated dry steam and/or cooling gases. Furthermore, the range of materials which can be laminated by this process is considerably enlarged.

While the preheatable scrim and method of the present invention have been described with reference to certain exemplifications and embodiments, the invention is not limited to the particular exemplifications and embodiments disclosed. Doubtless, other variations in design may occur to those skilled in the art without departing from the scope of the invention. The true scope of the present invention is limited only by the claims appended hereto.

I claim:

1. A method of bonding together two layers of material to produce a contoured laminate, said method comprising:
   providing said two layers at a first temperature;
   providing a flexible carrier;
   depositing a thermoplastic adhesive on said carrier to form an adhesive/carrier composite, said adhesive characterized in that it has a sharp melting point such that it can set and hold a bond;
   preheating the composite to a second temperature substantially higher than the first temperature, said second temperature being the activation temperature of the adhesive, while maintaining said two layers at said first temperature;
   placing the preheated composite at said second temperature between said two layers to form a sandwich assembly;
   pressing the sandwich assembly together to achieve intimate contact between the layers of material and the composite such that said layers act as a heat sink to rapidly cool said composite below said second temperature;
   maintaining said intimate contact for a time period sufficient to achieve bonding; and
   cold molding the sandwich assembly to form a contoured laminate.

2. The method of claim 1 wherein the step of depositing adhesive on the carrier is performed by melting the adhesive and dipping the carrier into the molten adhesive.

3. The method of claim 2 comprising the further step of brining the dipped carrier over a roll coater.

4. The method of claim 2 comprising the further step of bringing the dipped carrier over a knife edge to removed excess adhesive.

5. The method of claim 1 wherein the adhesive is provided as an adhesive film and the step of depositing the adhesive on the carrier is performed by pressing the carrier and the adhesive film together with a heated roller.

6. The method of claim 1 wherein the adhesive is provided as an adhesive film and the step of depositing the adhesive on the carrier is performed by flame laminating.

7. The method of claim 1 wherein the adhesive is provided as an adhesive film and the step of depositing the adhesive on the carrier is performed by convection heating with a hot wire.

8. The method of claim 1 wherein the carrier is provided in the form of a material selected from the group consisting of: metal wire, synthetic fibers, and natural fibers.

9. The method of claim 1 wherein the carrier is in the form of a woven, fiberglass open-mesh mat.

10. The method of claim 1 wherein the carrier is woven or knitted to form a grid having from between one strand every four linear inches to 200 strands per linear inch in both directions for conventional two direction construction, the grid not to exceed 400 strands per square inch in all directions.

11. The method of claim 10 wherein each individual strand of the grid has a diameter less than or equal to 0.200 inches.

12. The method of claim 1 wherein the carrier is formed of a non-woven, fibrous material, each of the fibers having a diameter equal or less than 0.200 inches, with the number of strands per square inch not exceeding 4000.

13. The method of claim 1 wherein the carrier is formed of a thin film selected from the group consisting of: metal foil, and plastic film, and both surfaces of said film are coated with adhesive.

14. The method of claim 1 wherein each of said layers has a respective degradation temperature and said second temperature is substantially higher than either of said degradation temperatures.

* * * * *